Aug. 18, 1931.  C. E. WILSON  1,819,938

CABLE CONNECTER AND METHOD OF APPLYING THE SAME

Filed Aug. 23, 1929

Inventor:
Charles E. Wilson.
by Charles E. Tullar
His Attorney.

Patented Aug. 18, 1931

1,819,938

UNITED STATES PATENT OFFICE

CHARLES E. WILSON, OF BRIDGEPORT, CONNECTICUT, ASSIGNOR TO GENERAL ELECTRIC COMPANY, A CORPORATION OF NEW YORK

CABLE CONNECTER AND METHOD OF APPLYING THE SAME

Application filed August 23, 1929. Serial No. 387,996.

In wiring buildings it is customary to employ flexible steel-armored cable. The usual practice is to connect the cable ends to metallic boxes by means of connecters, and to ground the cable and also the boxes by suitable means. In installing such cable, the wireman cuts the cable to the desired length and then removes the armor from the ends for four or five inches to expose the conductors or wires therein contained, which wires are subsequently connected to an electrical device within the box. Armored cable is a rather difficult thing to cut, owing chiefly to the fact that it is made of strip steel which is spirally wound around the wires and has interlocking edges to give the necessary flexibility and at the same time prevent elongation. The standard practice is to cut one or two of the metal turns in a diagonal plane with a hack saw and then to bend the cable back and forth until the armor breaks. In sawing, care must be exercised not to injure the insulation on the wires or conductors. In many cases the wiremen are careless and in removing the armor in the region of the boxes leave rough or raw ends and sometimes sharp edges or points of steel which injure the insulation and which sometimes cause short-circuits when the current is turned on. In any event, the end of the armor when cut by the ordinary methods is never smooth. In fact, the situation has become so serious, due to careless work, that the use of armored cable is prohibited in some localities unless some means are provided to protect the wires from the raw end edges of the armor.

My invention has for its object to provide an arrangement of parts and a method of assembly which will prevent injury to the wires when the cable is mechanically secured to the outlet or other metal box which contains the electrical device which is to be connected in circuit.

For a consideration of what I believe to be novel and my invention, attention is directed to the accompanying description and the claims appended thereto.

Figure 1:
Figure 2:
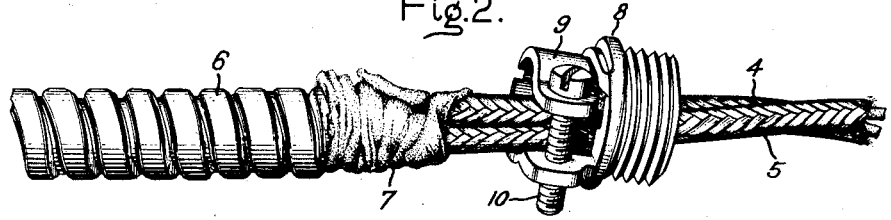
Figure 3:
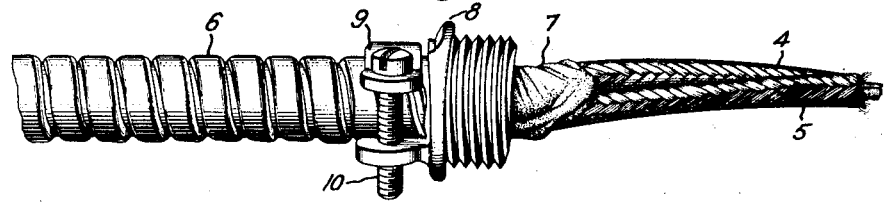
Figure 4:
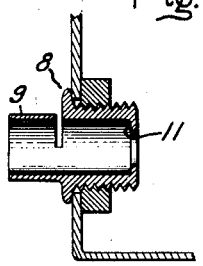

In the attached drawings, which are illustrative of my invention, Fig. 1 is a view of a piece of armored cable with its connecter displaced; Fig. 2 is a similar view showing the insulation which surrounds the pair of wires compressed; Fig. 3 shows the connecter in its final position on the cable, and Fig. 4 is a sectional view of the connecter and part of a box.

4 and 5 indicate the wires which are covered with any suitable kind of insulating material, and 6 the flexible steel-armor. Between the external surfaces of the wires and the interior wall of the armor is situated one or more layers of tough, crinkled paper 7, which may or may not be impregnated with a suitable insulating compound. The paper is applied to the wires prior to the armoring operation, and is quite loose thereon. The paper is in the form of a strip and is wrapped over the wires with a long pitch spiral, the successive turns overlapping at their edges by a small amount.

8 indicates the connecter which has a screw threaded end that enters the outlet box (not shown) and held by a nut as usual. It is also provided with a sleeve 9 that is split on one side to form a clamp, when the screw 10 is seated. The connecter has an internal shoulder 11, the edges of which are rounded to prevent injury to the wires. The purpose of the shoulder is to form a stop or device to compress the paper endwise when the connecter is moved longitudinally to its final position over the end of a piece of cable.

In making an installation, the wireman cuts the cable to the desired length and then removes several inches of the armor to expose the paper wrapping and the wires. A portion of the paper is then removed to expose the wires. The paper which is exposed is in the form of a tube having a longitudinal opening due to its spiral wrapping. The connecter is then pushed back over the wires to its final position as shown in Fig. 3, and in so doing the internal shoulder 11 thereof pushes or compresses the paper endwise as roughly indicated in Fig. 2 between it and the raw edge of the armor. As a result, some of the paper is jammed into the space between the wires and the armor and also covers the rough end of the armor and effectively prevents the metal thereof from cutting or otherwise injuring the insulation on the wires. It also practically fills the space within the connecter between the wires and the internal wall of the connecter, and in so doing forms a cushion and bushing for the wires and holds them away from the metal. In applying the connecter, it will usually be done by a screwing action with the result that some of the paper may project through the connecter and be exposed on the box side thereof, Fig. 3, and prevent the wires from resting directly on the shouldered part 11 which is an additional advantage because it insulates the wires and also prevents chafing of the insulation thereon as they are manipulated in being fastened to the electrical device within the box.

Reference has been made to a cable which has a paper wrapping permanently interposed between the wires and the armor. The advantages of my improvement may be obtained where there is no such permanent wrapping by loosely winding a strip of paper around a short length of the wires adjacent to the armoring, and then forcing the connecter over the armor and clamping it by the screw 10. When properly done, the rough raw edges of the armor will be fully prevented from injuring the wires. This arrangement is useful where paper covered wire is not avaliable and where it is desirable to fully protect the wire. In such a case no fastening of the paper is required, the wireman merely holding it with his fingers while forcing the connecter to its place. Viewed from one angle, the compressed body of paper acts to protect the wires from the raw edge of the armor, and also serves as an insulating bushing for the twisted wires where they leave the armor.

The fact that the paper is in the form of a strip which is wound over the wires means that no longitudinal cutting is required, which cutting might injure the insulation on the wires, and because it is in strip form it can be readily compressed or bunched to perform its function of a protective means and a bushing.

What I claim as new and desire to secure by Letters Patent of the United States, is:—

1. An armored cable containing wires and a connecter for securing the cable to a metal box, in combination with a body of paper which surrounds the wires, projects beyond thes armor and is compressed endwise between the raw end of the cable armor and a part of the connecter and forced into the space under the armor and between it and the wires.

2. An armored cable containing insulated wires and a connecter for securing the cable to a metal box, in combination with a body of paper which is wrapped around the wires, under the armor and is squeezed between the raw edge of the armor and an opposed surface of the connecter to substantially fill the space within the connecter not occupied by the wires and end of the armor.

3. The method of connecting an armored wire-containing cable to a connecter which comprises removing a portion of the armor from the end of the cable, removing a portion only of the outer wrapping between the wires and the armor, forcing the connecter by an endwise movement on to the armor to compress the remaining portion of the wrapping under and over the exposed end of the armor, and clamping the connecter to the cable.

4. The combination of an armored cable comprising individually insulated conductors, a strip of insulation around the conductors wound in the form of a long pitch spiral, a metallic armor enclosing the conductors and strip and terminating short of the conductor ends and strip, a metal connecter having means for securing it to the armor and other means for securing it to an outlet box, means forming a part of the connecter for endwise compressing that portion of the strip situated between the ends of the armor and conductors into a compact body both over and under the end portion of the armor to afford additional insulation for the conductors and also to protect the individual insulations on the conductors from injury due to the end of the armor.

In witness whereof, I have hereunto set my hand this 21st day of August, 1929.

CHARLES E. WILSON.